(12) United States Patent
Kuwahara

(10) Patent No.: US 11,808,649 B2
(45) Date of Patent: Nov. 7, 2023

(54) MAGNETIC SHIELD, SENSOR DEVICE, AND METHOD FOR ATTACHING MAGNETIC SHIELD

(71) Applicant: JTEKT CORPORATION, Kariya (JP)

(72) Inventor: Yuya Kuwahara, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 22 days.

(21) Appl. No.: 17/592,014

(22) Filed: Feb. 3, 2022

(65) Prior Publication Data

US 2022/0268650 A1    Aug. 25, 2022

(30) Foreign Application Priority Data

Feb. 25, 2021 (JP) .................................. 2021-029079

(51) Int. Cl.
    *G01L 3/10* (2006.01)
    *G01L 5/22* (2006.01)
    *H01F 27/36* (2006.01)

(52) U.S. Cl.
    CPC .............. *G01L 3/104* (2013.01); *G01L 5/221* (2013.01); *H01F 27/36* (2013.01)

(58) Field of Classification Search
    CPC ......... B62D 6/10; B62D 5/0463; G01L 3/101; G01L 3/10; G01L 3/104; G01L 5/221; G01D 5/14; H01F 27/36
    See application file for complete search history.

(56) References Cited

U.S. PATENT DOCUMENTS

| | | | |
|---|---|---|---|
| 10,048,143 B2* | 8/2018 | Toyama | G01L 3/104 |
| 10,067,016 B2* | 9/2018 | Hotta | G01L 5/221 |
| 10,081,386 B2* | 9/2018 | Toyama | B62D 6/10 |
| 2004/0074316 A1 | 4/2004 | Nakane et al. | |
| 2008/0028870 A1 | 2/2008 | Tokumoto et al. | |
| 2011/0221432 A1 | 9/2011 | Oota | |
| 2016/0178709 A1 | 6/2016 | Kozawa et al. | |
| 2020/0049577 A1* | 2/2020 | Tsuruo | H05K 5/0247 |

FOREIGN PATENT DOCUMENTS

| | | | | |
|---|---|---|---|---|
| JP | 2003-149062 A | | 5/2003 | |
| JP | 2004-125717 A | | 4/2004 | |
| JP | 2006071326 A | * | 3/2006 | |
| JP | 2020034398 A | * | 3/2020 | G01L 3/104 |

OTHER PUBLICATIONS

Jun. 29, 2022 Search Report issued in European Patent Application No. 22155631.9.

* cited by examiner

*Primary Examiner* — Octavia Davis Hollington
(74) *Attorney, Agent, or Firm* — Oliff PLC

(57) ABSTRACT

A magnetic shield includes a divided portion divided into a plurality of parts before attachment to a sensor device. The divided portion is integrated by bringing the plurality of parts close to or in contact with each other during the attachment to the sensor device. The divided portion in an integrated state includes a first shield portion that surrounds a body of a magnetic flux collecting ring from an outer side in a radial direction, and a second shield portion that surrounds a magnetic flux collecting portion of the magnetic flux collecting ring together with a magnetic sensor to extend outward in the radial direction from the first shield portion.

9 Claims, 9 Drawing Sheets

MAGNETIC SHIELD, SENSOR DEVICE, AND METHOD FOR ATTACHING MAGNETIC SHIELD

CROSS-REFERENCE TO RELATED APPLICATION

This application claims priority to Japanese Patent Application No. 2021-029079 filed on Feb. 25, 2021, incorporated herein by reference in its entirety.

BACKGROUND

1. Technical Field

The present disclosure relates to a magnetic shield, a sensor device, and a method for attaching the magnetic shield.

2. Description of Related Art

For example, Japanese Unexamined Patent Application Publication No. 2004-125717 (JP 2004-125717 A) discloses a torque sensor to be used in an electric power steering system and configured to detect a steering torque applied to a steering shaft. The torque sensor is configured to detect a torsional displacement caused in a torsion bar coupling an input shaft and an output shaft constituting the steering shaft.

Specifically, the torque sensor includes a multi-pole magnet, two magnetic yokes, two magnetic flux collecting rings, and a magnetic sensor. The multi-pole magnet is fixed to the input shaft. The two magnetic yokes are fixed to the output shaft. The two magnetic flux collecting rings induce magnetic fluxes from the two magnetic yokes. The magnetic sensor detects the magnetic fluxes induced in the two magnetic yokes.

The torque sensor of JP 2004-125717 A includes a magnetic shield that covers the outer circumference of the magnetic flux collecting rings to effectively prevent influence of an external magnetic field from an object other than a detection target. This magnetic shield is fixed by winding an iron plate around the outer circumference of the magnetic flux collecting rings.

SUMMARY

When an attempt is made to deform the iron plate along the outer circumference of the magnetic flux collecting rings to wind the iron plate around the outer circumference of the magnetic flux collecting rings, the shape of the iron plate varies in individual parts. When an attempt is made to suppress the variation in the shape of the iron plate in the individual parts, a period required for work increases and the efficiency decreases. That is, in the case of JP 2004-125717 A, the work of winding the iron plate around the outer circumference of the magnetic flux collecting rings is cumbersome in the magnetic shield.

A first aspect of the present disclosure relates to a magnetic shield. The magnetic shield is attached to a sensor device to surround a magnetic flux collecting ring from an outer side in a radial direction of a rotary shaft including a first shaft and a second shaft coupled to each other via a torsion bar. The sensor device includes a permanent magnet fixed to the first shaft and magnetized in a circumferential direction of the first shaft, a magnetic yoke fixed to the second shaft and arranged in a magnetic field of the permanent magnet to surround the permanent magnet from the outer side in the radial direction, the magnetic flux collecting ring including a body arranged to surround the magnetic yoke from the outer side in the radial direction and a magnetic flux collecting portion extending outward in the radial direction from the body, and a magnetic sensor arranged in association with the magnetic flux collecting portion and configured to detect a magnetic flux of a magnetic circuit including the permanent magnet, the magnetic yoke, and the magnetic flux collecting ring. The magnetic shield includes a divided portion divided into a plurality of parts before attachment to the sensor device. The divided portion is integrated by bringing the plurality of parts close to or in contact with each other during the attachment to the sensor device. The divided portion in an integrated state includes a first shield portion that surrounds the body of the magnetic flux collecting ring from the outer side in the radial direction, and a second shield portion that surrounds the magnetic flux collecting portion of the magnetic flux collecting ring together with the magnetic sensor to extend outward in the radial direction from the first shield portion.

A second aspect of the present disclosure relates to a method for attaching a magnetic shield. The magnetic shield is attached to a sensor device to surround a magnetic flux collecting ring from an outer side in a radial direction of a rotary shaft including a first shaft and a second shaft coupled to each other via a torsion bar. The sensor device includes a permanent magnet fixed to the first shaft and magnetized in a circumferential direction of the rotary shaft, a magnetic yoke fixed to the second shaft and arranged in a magnetic field of the permanent magnet to surround the permanent magnet from the outer side in the radial direction, the magnetic flux collecting ring including a body arranged to surround the magnetic yoke from the outer side in the radial direction and a magnetic flux collecting portion extending outward in the radial direction from the body, and a magnetic sensor arranged in association with the magnetic flux collecting portion and configured to detect a magnetic flux of a magnetic circuit including the permanent magnet, the magnetic yoke, and the magnetic flux collecting ring. The sensor device is structured such that a molded body obtained by resin-molding the magnetic flux collecting ring is attached to cover the rotary shaft together with the magnetic sensor. The method includes resin-molding the magnetic shield in a predetermined state together with the magnetic flux collecting ring during resin molding of the molded body. The predetermined state is a state in which a divided portion is integrated by bringing a plurality of parts close to or in contact with each other to include a first shield portion and a second shield portion. The divided portion is divided into the plurality of parts before attachment to the sensor device. The first shield portion surrounds the body of the magnetic flux collecting ring from the outer side in the radial direction. The second shield portion surrounds the magnetic flux collecting portion of the magnetic flux collecting ring together with the magnetic sensor.

A third aspect of the present disclosure relates to a method for attaching a magnetic shield. The magnetic shield is attached to a sensor device to surround a magnetic flux collecting ring from an outer side in a radial direction of a rotary shaft including a first shaft and a second shaft coupled to each other via a torsion bar. The sensor device includes a permanent magnet fixed to the first shaft and magnetized in a circumferential direction of the rotary shaft, a magnetic yoke fixed to the second shaft and arranged in a magnetic field of the permanent magnet to surround the permanent magnet from the outer side in the radial direction, the magnetic flux collecting ring including a body arranged to surround the magnetic yoke from the outer side in the radial direction and a magnetic flux collecting portion extending outward in the radial direction from the body, and a magnetic sensor arranged in association with the magnetic flux collecting portion and configured to detect a magnetic flux of a magnetic circuit including the permanent magnet, the magnetic yoke, and the magnetic flux collecting ring. The sensor device is structured such that a molded body obtained by resin-molding the magnetic flux collecting ring is attached to cover the rotary shaft together with the magnetic sensor. The method includes attaching the magnetic shield by causing the molded body to cover the rotary shaft together with the magnetic sensor and then integrating a divided portion by bringing a plurality of parts close to or in contact with each other to include a first shield portion and a second shield portion. The divided portion is divided into the plurality of parts before attachment to the sensor device. The first shield portion surrounds the body of the magnetic flux collecting ring from the outer side in the radial direction. The second shield portion surrounds the magnetic flux collecting portion of the magnetic flux collecting ring together with the magnetic sensor.

According to the structures described above, the divided portion can be formed into a shape that facilitates the attachment to the sensor device, and have a divisible structure that facilitates the attachment to the sensor device. Even though the magnetic shield is attached to the sensor device to, for example, surround the magnetic flux collecting ring from the outer side in the radial direction, there is no need to attach the magnetic shield while deforming the magnetic shield in conformity with the shape of the magnetic flux collecting ring. That is, the variation in the shape of the magnetic shield in the individual parts is suppressed when there is no need to attach the magnetic shield while deforming the magnetic shield in conformity with the shape of the magnetic flux collecting ring. There is no such case that the period required for work increases and the efficiency decreases in an attempt to suppress the variation in the shape of the magnetic shield in the individual parts. Therefore, it is possible to reduce cumbersomeness of the work of attaching the magnetic shield to the sensor device to surround the magnetic flux collecting ring from the outer side in the radial direction.

In the magnetic shield, the divided portion may include two portions that are a first portion and a second portion. The first portion and the second portion may have a symmetrical structure. The second shield portion may include a boundary portion between the first portion and the second portion.

According to the structure described above, the magnetic shield can easily be formed as compared with a case where the first portion and the second portion do not have the symmetrical structure. In the magnetic shield, the magnetic yoke may include two magnetic yokes juxtaposed in an axial direction of the rotary shaft. The magnetic flux collecting ring may include two magnetic flux collecting rings juxtaposed in the axial direction. The magnetic flux collecting portion may include two magnetic flux collecting portions spaced away from each other in the circumferential direction on the body. The magnetic sensor may include two magnetic sensors each arranged between the magnetic flux collecting portions overlapping each other in the axial direction among the magnetic flux collecting portions of the two magnetic flux collecting rings. The boundary portion may not overlap the magnetic flux collecting portions of the two magnetic flux collecting rings in the axial direction, and may overlap, in the axial direction, a portion between the two magnetic flux collecting portions adjacent to each other in the circumferential direction.

In the case of the structure described above, the boundary portion between the first portion and the second portion in the magnetic shield extends along a direction in which the magnetic flux passes through the magnetic sensor arranged between the magnetic flux collecting portions overlapping each other in the axial direction in the two magnetic flux collecting rings. That is, the second shield portion can continuously be connected without a disconnected portion in the direction in which the magnetic flux passes through the magnetic sensor. In this case, the second shield portion can form a bypass along a component of the magnetic flux passing through the magnetic sensor as a magnetic circuit of an external magnetic field. Therefore, the external magnetic field hardly passes through the magnetic sensor by passing through the bypass, thereby suppressing influence of the external magnetic field on the sensor device.

In the magnetic shield, the first portion and the second portion may have a clearance in the circumferential direction at the boundary portion. The clearance may be set smaller than a clearance between the two magnetic flux collecting portions adjacent to each other in the circumferential direction in each of the two magnetic flux collecting rings.

According to the structure described above, even when the boundary portion has the clearance, the external magnetic field hardly passes through the clearance between the first portion and the second portion. This is effective in suppressing the influence of the external magnetic field on the sensor device.

In the magnetic shield, the first shield portion may include a body covering portion that covers the body from the outer side in the radial direction. The first shield portion may include edge portions provided at both ends of the body covering portion in an axial direction of the rotary shaft to extend inward in the radial direction from the both ends. A bore radius of an imaginary circle connecting inner tips of each of the edge portions in the radial direction may be set smaller than an outside radius or a bore radius of the body.

According to the structure described above, the first shield portion can not only cover the outer circumference of the magnetic flux collecting ring by the body covering portion, but also cover at least a part of both ends of the magnetic flux collecting ring in the axial direction of the rotary shaft by the edge portions. Therefore, the magnetic shield can induce, through the edge portions of the first shield portion, an external magnetic field that is about to enter in the axial direction of the rotary shaft to suppress the influence on the magnetic sensor. This is effective in suppressing the influence of the external magnetic field on the sensor device.

In the magnetic shield, each of the edge portions may have a plurality of slits extending outward in the radial direction from an inner end in the radial direction. According to the structure described above, even when the edge portion of the magnetic shield is formed by, for example, bending the end of the body covering portion in the axial direction inward in the radial direction with respect to the body covering portion, the bending work is facilitated.

As described above, the edge portion of the magnetic shield may be formed by, for example, bending the end of the body covering portion in the axial direction inward in the radial direction with respect to the body covering portion. In this case, a stress may be generated at the root that is a starting point of bending at the time of forming the edge portion. This is because a residual stress generated due to the generation of the stress changes magnetic characteristics of the magnetic shield.

In the magnetic shield, the first shield portion may include a connection portion connecting the body covering portion and each of the edge portions. The connection portion may have a round shape. A curvature radius of a part of the connection portion on a side where the magnetic flux collecting ring is provided may be set twice or more as large as a thickness of the first shield portion.

According to the structure described above, it is possible to suppress the generation of the stress at the root that is the starting point of bending in the magnetic shield even when the edge portion is formed by bending the end of the body covering portion in the axial direction inward in the radial direction with respect to the body covering portion. Therefore, it is possible to suppress the generation of the residual stress due to the generation of the stress to suppress the change in the magnetic characteristics of the magnetic shield.

A fourth aspect of the present disclosure relates to a sensor device. The sensor device includes the magnetic shield. In this case, it is possible to attain a sensor device that can reduce the cumbersomeness of the work of attaching the magnetic shield to surround the magnetic flux collecting ring from the outer side in the radial direction.

With the magnetic shield, the sensor device, and the method for attaching the magnetic shield according to the present disclosure, the attachment work can be facilitated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Figure 4:
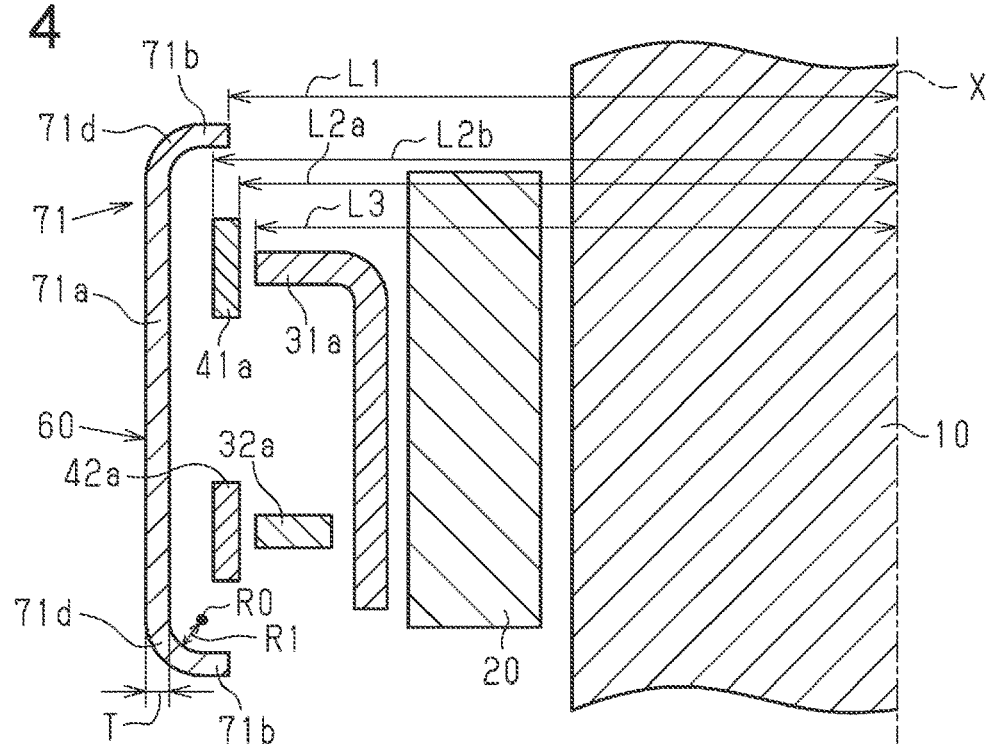
FIG. 4 is an end view illustrating a structure cut along a line IV-IV in FIG. 3.
Figure 6:
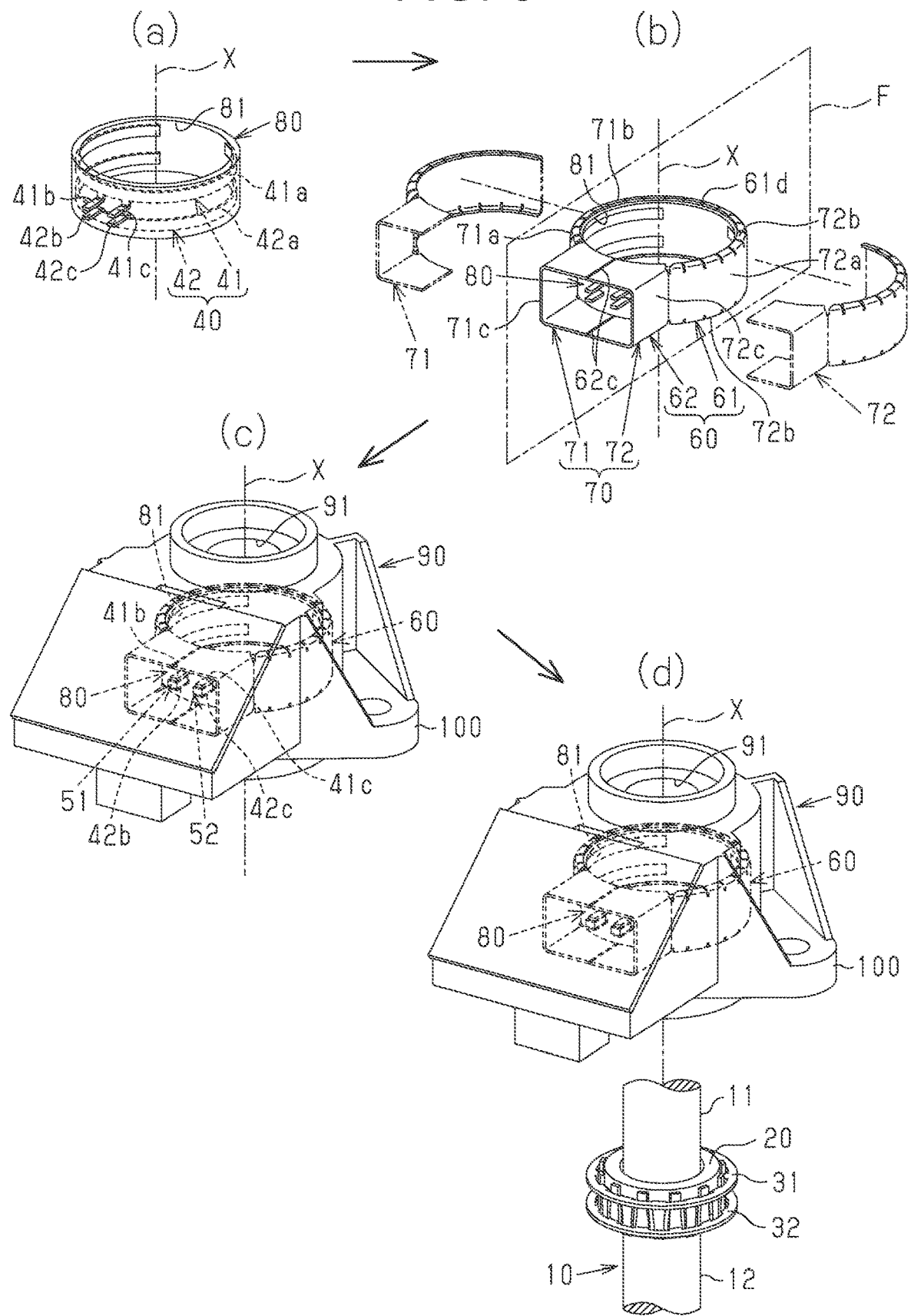
Figure 7:
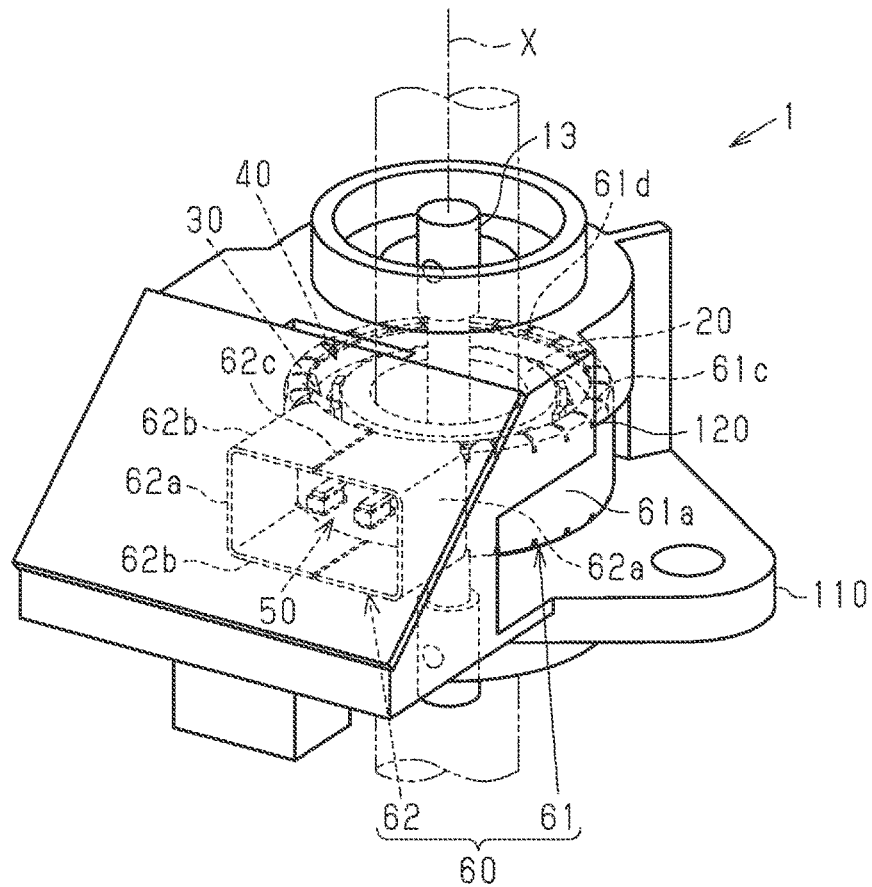
Figure 8:
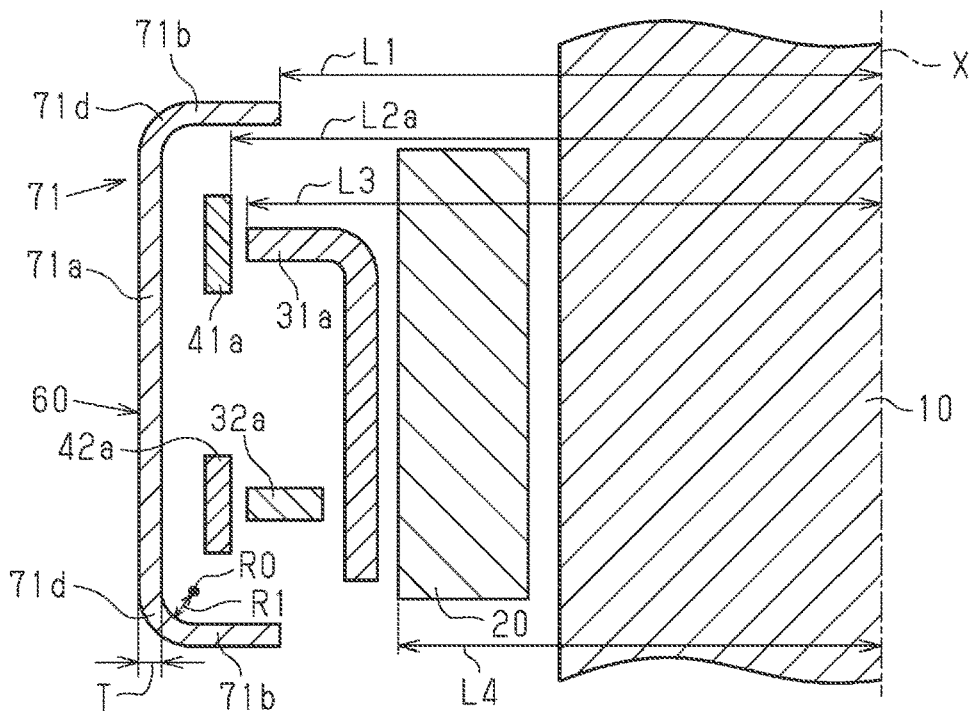
Figure 9:
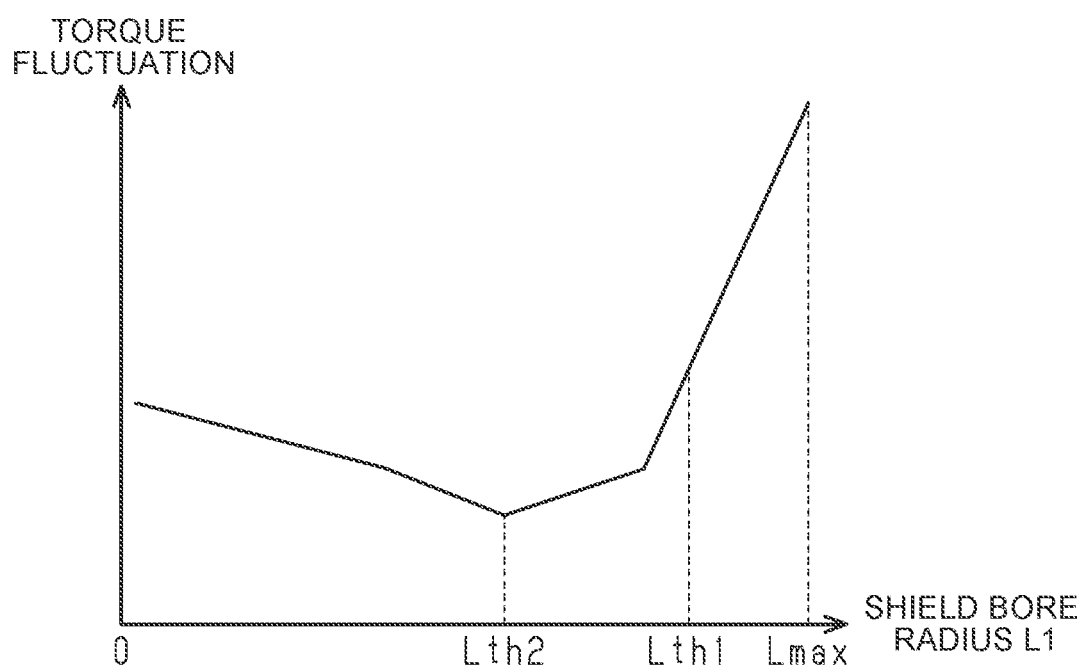
Figure 10:
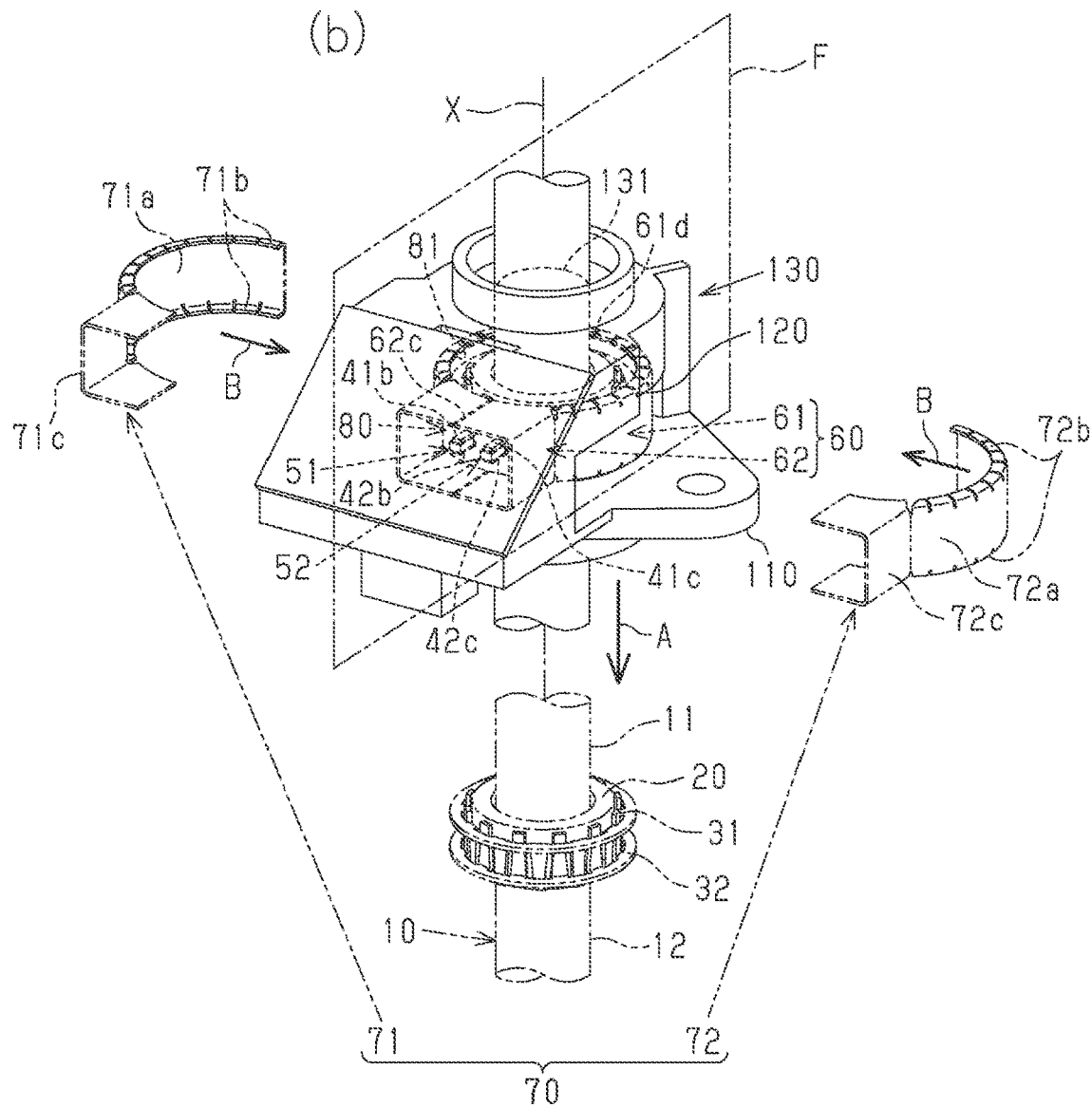
Figure 11:
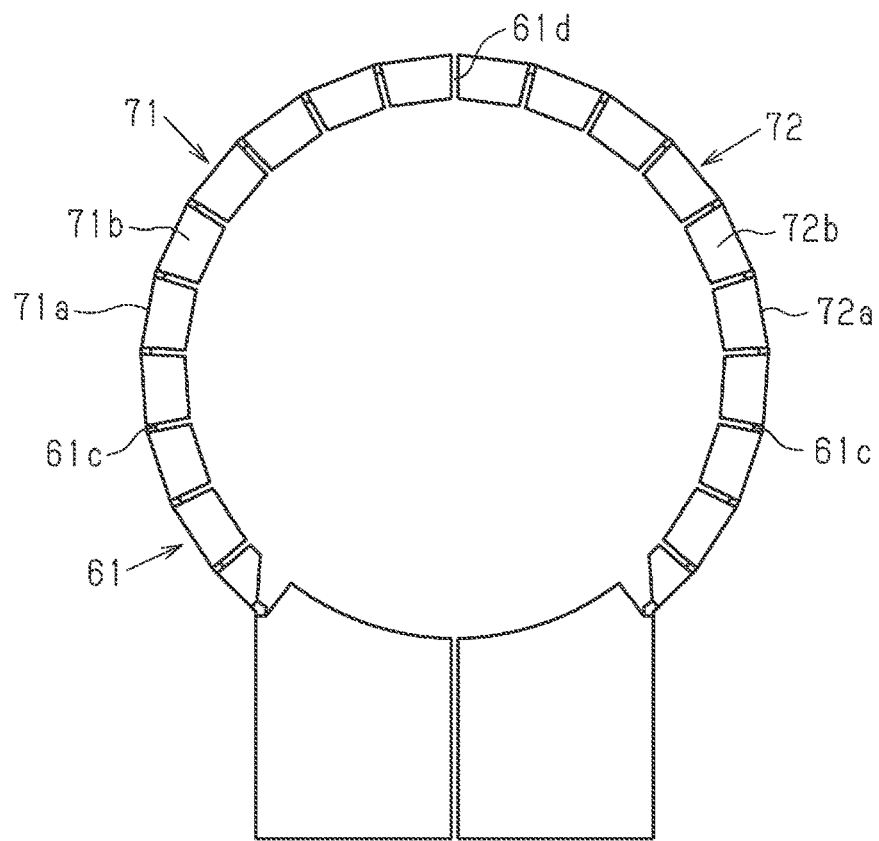
Figure 12:
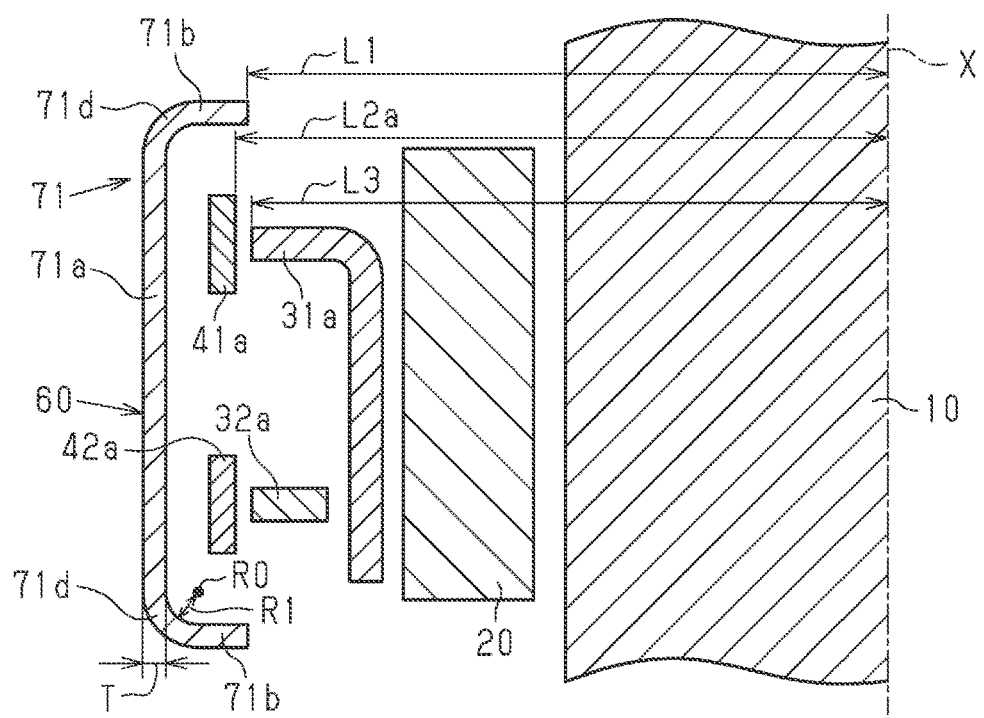

A portion (a) in FIG. 6 to a portion (d) in FIG. 6 are a diagram illustrating an assembling process of the sensor device of the first embodiment;

FIG. 7 is a perspective view illustrating a schematic structure of a sensor device according to a second embodiment;

FIG. 8 is an end view illustrating a structure of the sensor device of the second embodiment that is cut at the same position as that in FIG. 4;

FIG. 9 is a diagram illustrating a relationship between torque fluctuation and a shield bore radius;

A portion (a) in FIG. 10 and a portion (b) in FIG. 10 are a diagram illustrating an assembling process of the sensor device of the second embodiment;

FIG. 11 is a plan of a structure of a magnetic shield of another embodiment that is viewed from the top in the axial direction; and FIG. 12 is an end view illustrating a structure of a sensor device of another embodiment that is cut at the same position as that in FIG. 4.

DETAILED DESCRIPTION OF EMBODIMENTS

First Embodiment

A magnetic shield, a sensor device, and a method for attaching the magnetic shield according to a first embodiment will be described below with reference to the drawings.

Sensor Device 1

Figure 1:
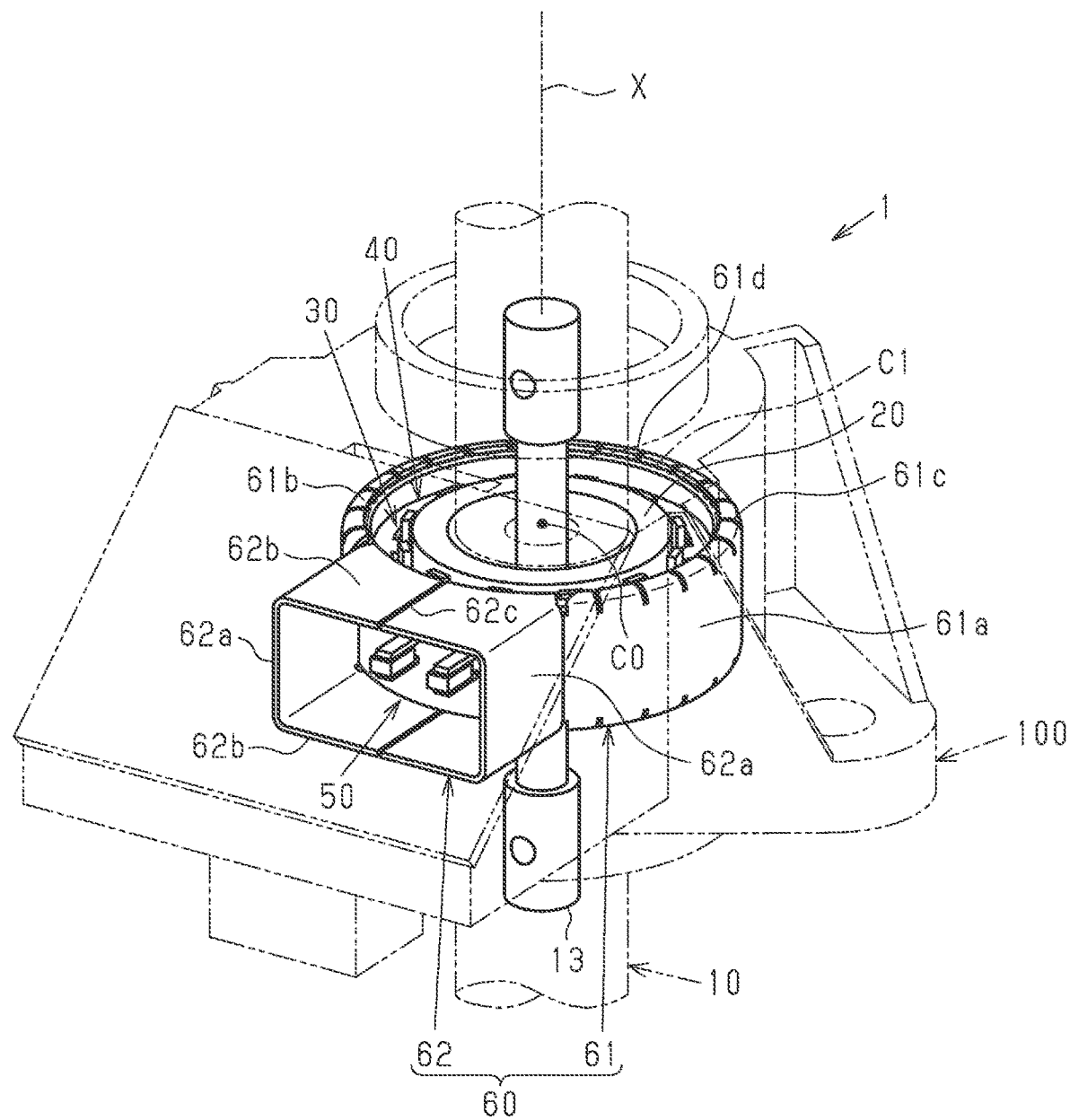
FIG. 1 is a perspective view illustrating a schematic structure of a sensor device according to a first embodiment.
Figure 2:
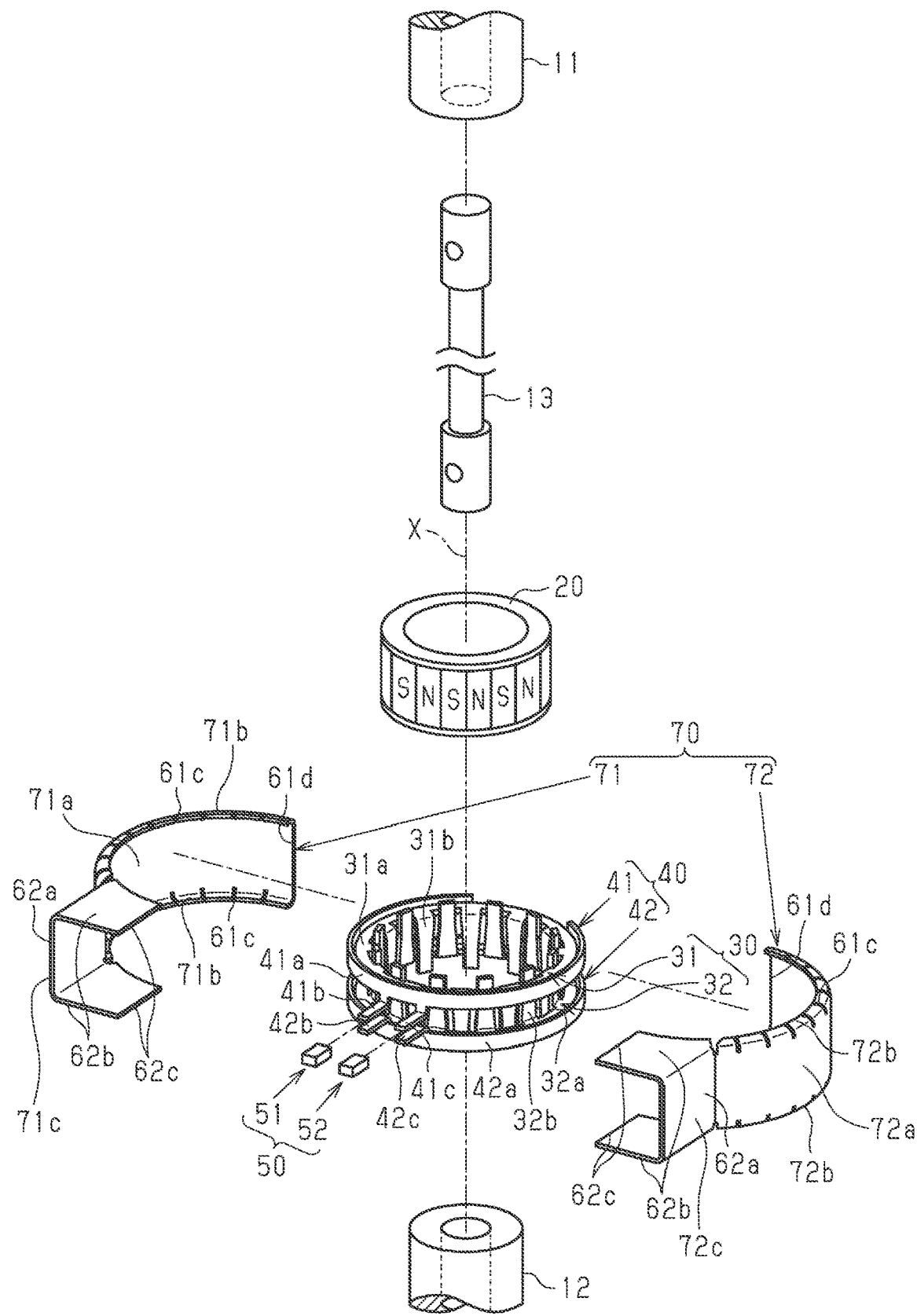
FIG. 2 is an exploded perspective view illustrating the schematic structure of the sensor device according to the first embodiment.

As illustrated in FIGS. 1 and 2, a sensor device 1 is provided on a rotary shaft 10. The sensor device 1 of the present embodiment is a torque sensor that detects a torque applied to the rotary shaft 10. Examples of the rotary shaft 10 include a steering shaft coupled to a steering wheel of an electric power steering system. The rotary shaft 10 includes an input shaft 11 that is a first shaft, an output shaft 12 that is a second shaft, and a torsion bar 13. The torsion bar 13 is arranged between the input shaft 11 and the output shaft 12. The input shaft 11 and the output shaft 12 are coupled on the same axis via the torsion bar 13.

Specifically, the sensor device 1 includes a permanent magnet 20, a magnetic yoke 30, a magnetic flux collecting ring 40, a magnetic sensor 50, and a magnetic shield 60. The permanent magnet 20 and the magnetic yoke 30 are fixed to the rotary shaft 10. The magnetic flux collecting ring 40, the magnetic sensor 50, and the magnetic shield 60 are housed inside a resin housing 100 that defines an outer shell of the sensor device 1. The sensor device 1 is attached such that the rotary shaft 10 to which the permanent magnet 20 and the magnetic yoke 30 are fixed is covered with the housing 100 from a side of the input shaft 11 to which the permanent magnet 20 is fixed. For convenience of description, the side of the input shaft 11 with respect to the rotary shaft 10 is hereinafter referred to as "upper side" and the side of the output shaft 12 with respect to the rotary shaft 10 is hereinafter referred to as "lower side". A direction along an axis X of the rotary shaft 10 is referred to as "axial direction". A direction orthogonal to the axis X of the rotary shaft 10 is referred to as "radial direction". A direction about the axis X of the rotary shaft 10 is referred to as "circumferential direction".

Permanent Magnet 20

As illustrated in FIG. 2, the permanent magnet 20 has a cylindrical shape. The permanent magnet 20 is fitted to the input shaft 11 to rotate together with the input shaft 11. In the permanent magnet 20, for example, N poles and S poles are alternately magnetized along the circumferential direction of the input shaft 11.

Magnetic Yoke 30

The magnetic yoke 30 includes a first magnetic yoke 31 and a second magnetic yoke 32. Each of the magnetic yokes 31 and 32 has a cylindrical shape. Each of the magnetic yokes 31 and 32 is arranged to surround the permanent magnet 20 from an outer side in the radial direction with a radial clearance from the permanent magnet 20. The magnetic yokes 31 and 32 are fitted to the output shaft 12 to rotate together with the output shaft 12. Each of the magnetic yokes 31 and 32 is arranged in a magnetic field formed by the permanent magnet 20, and forms a part of a magnetic circuit corresponding to the magnetic field of the permanent magnet 20. The first magnetic yoke 31 and the second magnetic yoke 32 are juxtaposed in the axial direction.

The first magnetic yoke 31 includes a first annular portion 31a. The first annular portion 31a extends continuously in the circumferential direction to surround the entire circumference of the permanent magnet 20. The first annular portion 31*a* has a plurality of plate-shaped first tooth portions 31*b* protruding downward in the axial direction from an inner circumferential end of the first annular portion 31*a*. The first tooth portions 31*b* are provided at equal intervals in the circumferential direction of the first annular portion 31*a*. The second magnetic yoke 32 includes a second annular portion 32*a* and a plurality of second tooth portions 32*b* as a structure corresponding to that of the first magnetic yoke 31.

The magnetic yokes 31 and 32 are combined so that the first tooth portions 31*b* and the second tooth portions 32*b* protrude in different directions of the axial direction. The first tooth portions 31*b* and the second tooth portions 32*b* are arranged alternately in the circumferential direction so as not to overlap each other in the radial direction.

Magnetic Flux Collecting Ring 40

The magnetic flux collecting ring 40 includes a first magnetic flux collecting ring 41 and a second magnetic flux collecting ring 42. Each of the magnetic flux collecting rings 41 and 42 has an annular shape. The first magnetic flux collecting ring 41 is arranged to surround the first magnetic yoke 31 from the outer side in the radial direction with a radial clearance from the first magnetic yoke 31. The second magnetic flux collecting ring 42 is arranged to surround the second magnetic yoke 32 from the outer side in the radial direction with a radial clearance from the second magnetic yoke 32. Each of the magnetic flux collecting rings 41 and 42 is arranged in the magnetic field formed by the permanent magnet 20, and forms a part of the magnetic circuit corresponding to the magnetic field of the permanent magnet 20. The first magnetic flux collecting ring 41 and the second magnetic flux collecting ring 42 are juxtaposed in the axial direction.

The first magnetic flux collecting ring 41 includes a C-shaped cylindrical first body 41*a* when viewed in the axial direction. The first body 41*a* extends continuously in the circumferential direction to surround a part of the outer circumference of the first annular portion 31*a* of the first magnetic yoke 31. The first body 41*a* has two first magnetic flux collecting portions 41*b* and 41*c* protruding outward in the radial direction from the lower end of the first body 41*a*. The two first magnetic flux collecting portions 41*b* and 41*c* are arranged at a predetermined interval in the circumferential direction of the first body 41*a*. Each of the first magnetic flux collecting portions 41*b* and 41*c* has a substantially rectangular shape when viewed in the axial direction. The second magnetic flux collecting ring 42 includes a second body 42*a* and second magnetic flux collecting portions 42*b* and 42*c* as a structure corresponding to that of the first magnetic flux collecting ring 41.

Magnetic Sensor 50

The magnetic sensor 50 includes a first magnetic sensor 51 and a second magnetic sensor 52. Examples of the magnetic sensors 51 and 52 include a Hall sensor. The first magnetic sensor 51 is arranged between the first magnetic flux collecting portion 41*b* and the second magnetic flux collecting portion 42*b*. The second magnetic sensor 52 is arranged between the first magnetic flux collecting portion 41*c* and the second magnetic flux collecting portion 42*c*. Each of the magnetic sensors 51 and 52 detects, as an electric signal, the magnetic flux of the magnetic circuit formed by the permanent magnet 20, the first magnetic yoke 31, the second magnetic yoke 32, the first magnetic flux collecting ring 41, and the second magnetic flux collecting ring 42.

When a relative rotational displacement occurs between the input shaft 11 and the output shaft 12 of the rotary shaft 10, the torsion bar 13 is twisted to deform. In the state in which the torsion bar 13 is twisted to deform, each of the first tooth portions 31*b* is displaced in the circumferential direction to have an angle difference as compared with the state in which the torsion bar 13 is not twisted to deform. The same applies to each of the second tooth portions 32*b*. In the state in which the torsion bar 13 is twisted to deform, a magnetic circuit corresponding to the magnetic field of the permanent magnet 20 is formed by the magnetic yokes 31 and 32 and the magnetic flux collecting rings 41 and 42, and a magnetic flux corresponding to the amount of torsional deformation of the torsion bar 13 is transmitted to the tooth portions 31*b* and 32*b*. Then, each of the magnetic sensors 51 and 52 generates an electric signal corresponding to the magnetic flux of the magnetic circuit induced based on the torsional deformation of the torsion bar 13. A control device (not illustrated) connected to the magnetic sensors 51 and 52 calculates a torque acting on the rotary shaft 10 as a steering torque based on the electric signals generated by the magnetic sensors 51 and 52.

Magnetic Shield 60

As illustrated in FIGS. 1 and 2, the magnetic shield 60 is arranged to surround the magnetic flux collecting ring 40, that is, the magnetic flux collecting rings 41 and 42 in the radial direction and the axial direction. The magnetic shield 60 is made of a metal material capable of blocking magnetism, typified by a steel sheet such as a cold rolled carbon steel sheet SPCC or an electrolytic zinc-coated steel sheet SECC. That is, the magnetic shield 60 suppresses transmission of an external magnetic field from an object other than a detection target as magnetic noise to the magnetic flux collecting ring 40, that is, the magnetic flux collecting rings 41 and 42 and furthermore the magnetic sensor 50, that is, the magnetic sensors 51 and 52. In this embodiment, the magnetic shield 60 is resin-molded on the housing 100.

The magnetic shield 60 includes a first shield portion 61 and a second shield portion 62. The first shield portion 61 surrounds the bodies 41*a* and 42*a* of the magnetic flux collecting rings 41 and 42 except a periphery provided with the magnetic flux collecting portions 41*b*, 41*c*, 42*b*, and 42*c* from the outer side in the radial direction and both sides in the axial direction. The second shield portion 62 extends outward in the radial direction from the first shield portion 61, and surrounds the magnetic flux collecting portions 41*b*, 41*c*, 42*b*, and 42*c* of the magnetic flux collecting rings 41 and 42 together with the magnetic sensors 51 and 52.

First Shield Portion 61

Specifically, as illustrated in FIGS. 1 and 2, the first shield portion 61 includes a body covering portion 61*a* and edge portions 61*b*. The body covering portion 61*a* has a thickness in the radial direction and has a substantially cylindrical shape partially disconnected in the circumferential direction. The body covering portion 61*a* extends continuously in the circumferential direction to surround the outer circumferential surfaces of the bodies 41*a* and 42*a* of the magnetic flux collecting rings 41 and 42 in the radial direction except the periphery provided with the magnetic flux collecting portions 41*b*, 41*c*, 42*b*, and 42*c*.

The edge portions 61*b* extend inward in the radial direction from both ends of the body covering portion 61*a* in the axial direction. Each edge portion 61*b* has a thickness in the axial direction and has a substantially annular shape partially disconnected in the circumferential direction. Each edge portion 61*b* is divided into a plurality of parts in the circumferential direction through a plurality of slits 61*c* extending from the inner end of each edge portion 61b in the radial direction toward the body covering portion 61a on the outer side in the radial direction. The body covering portion 61a is divided into two parts in the circumferential direction through a slit 61d provided at the center in the circumferential direction between the two ends of the body covering portion 61a and each edge portion 61b among the slits 61c. Each slit 61c other than the slit 61d extends to a part of each end of the body covering portion 61a in the axial direction. The edge portions 61b extend intermittently in the circumferential direction via the slits 61c to surround both end faces of the bodies 41a and 42a in the axial direction.

Second Shield Portion 62

The second shield portion 62 includes first sensor covering portions 62a and second sensor covering portions 62b. The first sensor covering portions 62a extend in the radial direction from both ends of the body covering portion 61a in the circumferential direction, and have a flat plate shape with a thickness in the circumferential direction. The first sensor covering portions 62a extend continuously in the axial direction to surround the outer surfaces of the magnetic flux collecting portions 41b, 41c, 42b, and 42c of the magnetic flux collecting rings 41 and 42 in the circumferential direction opposite to the side where the magnetic flux collecting portions 41b, 41c, 42b, and 42c adjoin each other.

The second sensor covering portions 62b connect, in the circumferential direction, both ends of the first sensor covering portions 62a in the axial direction, and have a flat plate shape with a thickness in the axial direction. When the inner tip of each second sensor covering portion 62b in the radial direction is connected to the tip of each edge portion 61b in the radial direction, an imaginary circle C1 having a center point C0 passing through the axis X is formed. That is, the inner portion of each second sensor covering portion 62b in the radial direction partially extends in the circumferential direction from each edge portion 61b.

Each second sensor covering portion 62b is divided into two parts in the circumferential direction through a single slit 62c extending from the inner end of each second sensor covering 62b in the radial direction toward the first sensor covering portion 62a on the outer side in the radial direction. The slit 62c is provided at the center of the second sensor covering portion 62b in the circumferential direction. That is, the slit 62c is provided at the center in the circumferential direction between the first magnetic flux collecting portions 41b and 41c adjacent to each other in the circumferential direction. The same applies to the second magnetic flux collecting portions 42b and 42c adjacent to each other in the circumferential direction. The phase of the slit 62c is shifted by 180 degrees in the circumferential direction from the phase of the slit 61d provided in the first shield portion 61. The second sensor covering portions 62b extend intermittently in the circumferential direction via the slits 62c to surround both end faces of the magnetic flux collecting portions 41b, 41c, 42b, and 42c in the axial direction.

Divided Portion 70

As illustrated in FIG. 2, the magnetic shield 60 includes a divided portion 70 formed such that two portions that are a first portion 71 and a second portion 72 are integrated by coming close to each other. The portions 71 and 72 are two divided portions in a state before attachment to the sensor device 1, and have a symmetrical structure. The portions 71 and 72 are two divided portions across boundary portions that are the slit 61d provided in the first shield portion 61 and the slits 62c provided in the second shield portion 62.

The portions 71 and 72 are formed in advance before attachment to the sensor device 1 by bending steel sheets made of the metal material described above. The portions 71 and 72 are formed into a shape that facilitates attachment to the sensor device 1, and have a divisible structure that facilitates attachment to the sensor device 1.

Specifically, the first portion 71 includes a first body segment 71a shaped as one of two divided portions of the body covering portion 61a of the first shield portion 61 across the slit 61d, that is, one of mated portions constituting the body covering portion 61a in a state in which the first portion 71 is integrated with the second portion 72. The first portion 71 includes first edge segments 71b each shaped as one of two divided portions of each edge portion 61b of the first shield portion 61 across the slit 61d, that is, one of mated portions constituting each edge portion 61b in the state in which the first portion 71 is integrated with the second portion 72. The first portion 71 includes a first sensor segment 71c shaped as one of two divided portions of each of the sensor covering portions 62a and 62b across the slit 62c, that is, one of mated portions constituting the second shield portion 62 in the state in which the first portion 71 is integrated with the second portion 72.

The second portion 72 mated with the first portion 71 includes a second body segment 72a as one of the mated portions constituting the body covering portion 61a of the first shield portion 61 in the state in which the second portion 72 is integrated with the first portion 71. The second portion 72 includes second edge segments 72b each as one of the mated portions constituting each edge portion 61b of the first shield portion 61 in the state in which the second portion 72 is integrated with the first portion 71. The second portion 72 includes a second sensor segment 72c as one of the mated portions constituting the second shield portion 62 in the state in which the second portion 72 is integrated with the first portion 71.

Slits 62c

Figure 3:
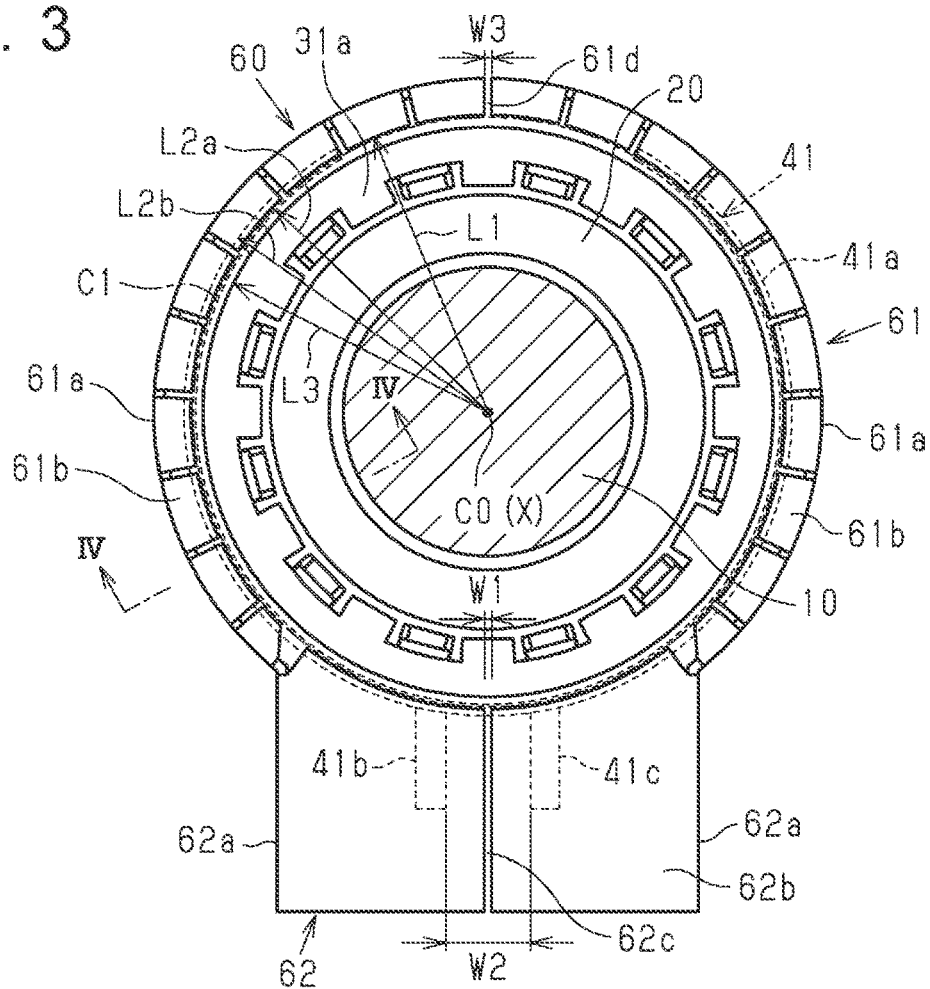
FIG. 3 is a plan of the structure of the sensor device of the first embodiment that is viewed from the top in an axial direction.

As illustrated in FIG. 3, when viewed from the top in the axial direction, the slit 62c provided in each second sensor covering portion 62b to divide the second shield portion 62 into two parts is arranged at the center in the circumferential direction between the first magnetic flux collecting portions 41b and 41c adjacent to each other in the circumferential direction in the first magnetic flux collecting ring 41. The same applies to the second magnetic flux collecting ring 42. That is, the slit 62c is arranged at the center in the circumferential direction between the second magnetic flux collecting portions 42b and 42c adjacent to each other. A clearance W1 of the slit 62c in the circumferential direction is set smaller than a clearance W2 between the first magnetic flux collecting portions 41b and 41c adjacent to each other in the circumferential direction. For example, the clearance W1 is set to a size within a range experimentally determined in consideration of various tolerances such as manufacturing tolerances from the viewpoint of suppressing passage of an external magnetic field from an object other than the detection target through the slit 62c. The slit 61d provided in the first shield portion 61 to divide the first shield portion 61 into the body segments 71a and 72a and into the edge segments 71b and 72b has a clearance W3 in the circumferential direction that is set substantially equal to the clearance W1.

When the slit 62c is provided in the second shield portion 62, the magnetic resistance in the slit 62c can be increased as compared with the other portions. In the second shield portion 62, the first sensor covering portion 62a is continuously connected without a disconnected portion in the axial direction in which the magnetic flux passes through the magnetic sensors 51 and 52. For example, an external magnetic field transmitted to the magnetic shield 60 from the top in the axial direction is not transmitted in the circumferential direction in which the second shield portion 62 extends discontinuously across the slit 62c, but is transmitted in the axial direction in which the second shield portion 62 extends continuously without the slit 62c.

Shield Bore Radius L1

As illustrated in FIGS. 3 and 4, a shield bore radius L1 of the magnetic shield 60 that is a bore radius of the imaginary circle C1 having the center point C0 passing through the axis X and connecting the inner tips of each edge portion 61b and each second sensor covering portion 62b in the radial direction is set larger than a ring bore radius L2a that is a bore radius of each of the bodies 41a and 42a of the magnetic flux collecting rings 41 and 42. The shield bore radius L1 is set smaller than a ring outside radius L2b that is an outside radius of each of the bodies 41a and 42a of the magnetic flux collecting rings 41 and 42. That is, the shield bore radius L1 is set larger than a yoke outside radius L3 that is an outside radius of each of the annular portions 31a and 32a of the magnetic yokes 31 and 32.

Connection Portions 71d

As illustrated in FIG. 4, in the first portion 71, each end of the first body segment 71a in the axial direction and the outer end of each first edge segment 71b in the radial direction are connected via a round connection portion 71d. That is, in the first shield portion 61, each connection portion 71d couples each end of the body covering portion 61a in the axial direction and the outer end of each edge portion 61b in the radial direction. Therefore, each end of the first body segment 71a in the axial direction and the outer end of each first edge segment 71b in the radial direction are connected without intervention of a substantially right-angled intersection portion in their extending directions. In each connection portion 71d, a curvature radius R1 from an imaginary center R0 of an inner portion in the radial direction on a side where the magnetic flux collecting rings 41 and 42 are provided is set slightly larger in consideration of various tolerances such as manufacturing tolerances based on a value twice as large as a thickness T of the first body segment 71a in the radial direction and of the first edge segment 71b in the axial direction. The same applies to a connection portion 72d coupling each end of the second body segment 72a in the axial direction and the outer end of each second edge segment 72b in the radial direction in the second portion 72.

In the portions 71 and 72, each of the body segments 71a and 72a is formed by curving a steel sheet made of the metal material described above into a semi-cylindrical shape. Each of the edge segments 71b and 72b is formed by bending a portion within a predetermined range from each end of the semi-cylindrically curved body segment 71a or 72a in the axial direction to the inner side in the radial direction from a starting point that is the root of the portion that serves as the connection portion 71d or 72d. At the root that is the starting point of bending at the time of forming each of the edge segments 71b and 72b, a residual stress is generated due to a stress acting on the root along with the bending. Regarding the portion where the residual stress is generated for the metal material, it is known that magnetic characteristics are changed so that the metal material may have magnetic characteristics different from original magnetic characteristics of the metal material.

When the SPCC or the SECC is adopted as the material of the magnetic shield 60 as in the present embodiment, the magnetic characteristics at the root that is the starting point of bending at the time of forming each of the edge segments 71b and 72b where the residual stress is generated are worse than the magnetic characteristics at the other portions. In this case, the magnetic transmission efficiency at the root that is the starting point of bending at the time of forming each of the edge segments 71b and 72b is lower than the magnetic transmission efficiency at the other portions. This is more conspicuous as the residual stress increases. The increase in the residual stress means a relationship in which the curvature radius R1 decreases and the shape of the connection portion 71d becomes closer to a right-angled shape rather than the round shape. The decrease in the magnetic transmission efficiency means a relationship in which influence of the external magnetic field increases, that is, torque fluctuation in the steering torque that is a result of detection by the sensor device 1 increases. Those relationships can be described by defining the curvature radius R1 using the magnitude of the thickness T of the metal material used for the magnetic shield 60.

Figure 5:
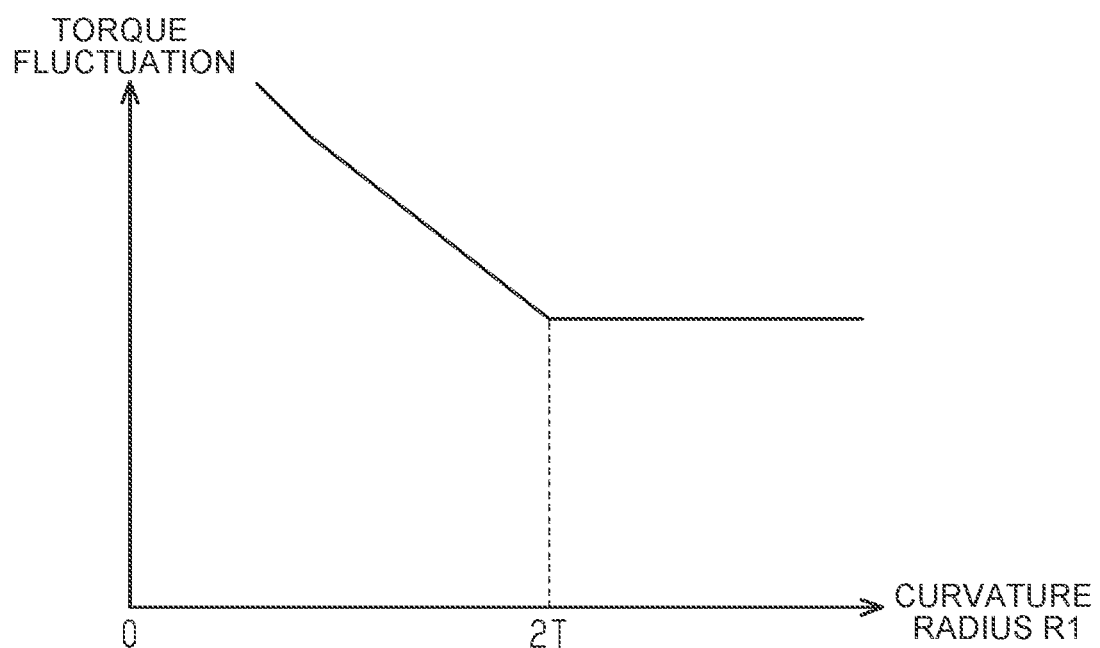
FIG. 5 is a diagram illustrating a relationship between torque fluctuation and a curvature radius of an inner portion of a connection portion in a radial direction.

For example, FIG. 5 illustrates a result experimentally obtained as a characteristic of the torque fluctuation when the SPCC or the SECC is adopted as the metal material for the magnetic shield 60. Specifically, the horizontal axis represents the curvature radius R1, and the vertical axis represents the magnitude of torque fluctuation.

FIG. 5 demonstrates a result showing a characteristic that the torque fluctuation is suppressed as the curvature radius R1 increases from the vicinity of zero. This is because the deterioration of the magnetic characteristics of each connection portion 71d compared with those of the other portions is suppressed as the curvature radius R1 increases. The result shows a characteristic that, when the curvature radius R1 so increases that the deterioration of the magnetic characteristics of each connection portion 71d compared with those of the other portions is not observed, the torque fluctuation hardly occurs though the curvature radius R1 increases. The result shows that the boundary between the characteristic that the torque fluctuation is suppressed and the characteristic that the torque fluctuation hardly occurs is present at the curvature radius R1 equal to the value twice as large as the thickness T.

The structure related to each connection portion 71d similarly applies to a portion of the second shield portion 62 that connects each end of the first sensor covering portion 62a in the axial direction and the end of each second sensor covering portion 62b opposite to the slit 62c in the circumferential direction.

Method for Attaching Magnetic Shield 60

A method for assembling the sensor device 1 of the present embodiment will be described below together with a method for attaching the magnetic shield 60.

The method for assembling the sensor device 1 of the present embodiment is roughly divided into four steps in sequence, that is, a primary molding step, a shield attaching step, a secondary molding step, and an assembling step.

As illustrated in a portion (a) in FIG. 6, in the primary molding step, a first molded body 80 is formed by resin-molding the magnetic flux collecting rings 41 and 42. At the time of resin molding in the primary molding step, the magnetic flux collecting rings 41 and 42 are positionally adjusted so that the bodies 41a and 42a, the magnetic flux collecting portions 41b and 42b, and the magnetic flux collecting portions 41c and 42c overlap each other in the axial direction, respectively. The magnetic flux collecting rings 41 and 42 are positionally adjusted so that the bodies 41a and 42a are spaced away from each other in the axial direction. That is, a region for arranging the first magnetic sensor 51 is secured between the magnetic flux collecting portions 41b and 42b in the axial direction. A region for arranging the second magnetic sensor 52 is secured between the magnetic flux collecting portions 41c and 42c in the axial direction.

The first molded body 80 is formed into a cylindrical shape with a first shaft hole 81 obtained by extending, in the axial direction, a columnar region obtained about the axis X along the inner circumference of the magnetic flux collecting rings 41 and 42. In the first molded body 80, the inner portions of the bodies 41a and 42a in the radial direction are exposed, and the outer portions of the bodies 41a and 42a in the radial direction are covered. In the first molded body 80, the entire magnetic flux collecting portions 41b, 41c, 42b, and 42c are exposed.

As illustrated in a portion (b) in FIG. 6, in the shield attaching step, the divided portion 70, that is, the first portion 71 and the second portion 72 are attached to the first molded body 80. Prior to the attachment in the shield attaching step, the divided portion 70 is prepared in advance by being molded as the individual portions 71 and 72. At the time of attachment in the shield attaching step, the portions 71 and 72 prepared in advance are positionally adjusted so that the sensor segments 71c and 72c are positioned in association with the magnetic flux collecting portions 41b, 41c, 42b, and 42c in a state in which the tips of the edge segments 71b and 72b face each other. That is, the portions 71 and 72 are positionally adjusted to have a symmetrical structure across a plane F passing through the axis X and the center in the circumferential direction between the first magnetic flux collecting portions 41b and 41c or the magnetic flux collecting portions 42b and 42c adjacent to each other in the circumferential direction. The portions 71 and 72 are closely integrated to define the slits 61d and 62c as the boundary portions while sandwiching the first molded body 80 from the outer side of the first molded body 80 in the radial direction.

Through the shield attaching step, the first shield portion 61 appears as a portion surrounding the bodies 41a and 42a of the magnetic flux collecting rings 41 and 42 except the periphery provided with the magnetic flux collecting portions 41b, 41c, 42b, and 42c from the outer side in the radial direction and both sides in the axial direction. In addition, the second shield portion 62 appears as a portion surrounding the magnetic flux collecting portions 41b, 41c, 42b, and 42c of the magnetic flux collecting rings 41 and 42. In particular, when viewed from the top in the axial direction, the slit 62c is arranged at the center in the circumferential direction between the first magnetic flux collecting portions 41b and 41c of the magnetic flux collecting ring 41 adjacent to each other in the circumferential direction. The same applies to the second magnetic flux collecting ring 42. In this way, the attachment of the magnetic shield 60 to the first molded body 80 is completed.

As illustrated in a portion (c) in FIG. 6, in the secondary molding step, a second molded body 90 is formed by resin-molding the first molded body 80 in the state in which the magnetic shield 60 is attached. After the resin molding in the secondary molding step, various components such as a sensor board on which the magnetic sensors 51 and 52 are mounted are inserted into and fixed to the second molded body 90 by, for example, heat crimping. In this case, the sensor board is positionally adjusted so that the first magnetic sensor 51 is arranged between the magnetic flux collecting portions 41b and 42b and the second magnetic sensor 52 is arranged between the magnetic flux collecting portions 41c and 42c.

The second molded body 90 is molded to have a second shaft hole 91 obtained by extending the first shaft hole 81 of the first molded body 80 in the axial direction. In the second molded body 90, the entire first molded body 80 is covered in the state in which the magnetic shield 60 is attached. That is, the magnetic shield 60 is attached to the sensor device 1 by being resin-molded together with the magnetic flux collecting rings 41 and 42 when the second molded body 90 is resin-molded. In the second molded body 90, the portion molded through the secondary molding step functions as the housing 100.

As illustrated in a portion (d) in FIG. 6, in the assembling step, the second molded body 90, that is, the housing 100 molded through the secondary molding step is attached together with various components such as the sensor board to cover the rotary shaft 10 to which the permanent magnet 20 and the magnetic yokes 31 and 32 are fixed from the side of the input shaft 11 to which the permanent magnet 20 is fixed. At the time of attachment to the rotary shaft 10 in the assembling step, the second molded body 90 is attached by inserting the rotary shaft 10 into the second shaft hole 91, that is, the first shaft hole 81. Depending on the relationship between the shield bore radius L1 and the yoke outside radius L3, the magnetic shield 60 may interfere with the magnetic yokes 31 and 32. The interference of the magnetic shield 60 and the magnetic yokes 31 and 32 is avoided by setting the shield bore radius L1 to be larger than the yoke outside radius L3.

In the state in which the second molded body 90 covers the rotary shaft 10, the permanent magnet 20, the magnetic yokes 31 and 32, the magnetic flux collecting rings 41 and 42, and the magnetic shield 60 are positionally adjusted to achieve predetermined arrangements while overlapping each other in the radial direction. In this way, the assembling of the sensor device 1 is completed.

Actions of the present embodiment will be described below. According to the present embodiment, the divided portion 70 can be formed into the shape that facilitates attachment to the sensor device 1, and have the divisible structure that facilitates attachment to the sensor device 1.

Specifically, as described in the shield attaching step, the divided portion 70 is prepared in advance by being molded from the metal material described above as the individual portions 71 and 72. The portions 71 and 72 prepared in advance are closely integrated while sandwiching the first molded body 80 from the outer side of the first molded body 80 in the radial direction. Only in this way, the magnetic shield 60 can be attached to the first molded body 80, that is, the sensor device 1.

That is, in the present embodiment, even though the magnetic shield 60 is attached to the sensor device 1 to surround the magnetic flux collecting rings 41 and 42 in the radial direction and the axial direction, there is no need to attach the magnetic shield 60 while deforming the magnetic shield 60 in conformity with the shapes of the magnetic flux collecting rings 41 and 42.

Effects of the present embodiment will be described below. In the present embodiment, the variation in the shape of the magnetic shield 60 in the individual parts is suppressed when there is no need to attach the magnetic shield 60 while deforming the magnetic shield 60 in conformity with the shapes of the magnetic flux collecting rings 41 and 42. There is no such case that the period required for work increases and the efficiency decreases in an attempt to suppress the variation in the shape of the magnetic shield 60 in the individual parts. Therefore, it is possible to reduce cumbersomeness of the work of attaching the magnetic shield 60 to the sensor device 1 to surround the magnetic flux collecting rings 41 and 42 in the radial direction and the axial direction.

In the divided portion 70, the portions 71 and 72 have the symmetrical structure of the two divided portions across the slits 61d and 62c. That is, according to the present embodiment, the magnetic shield 60 can easily be formed as compared with a case where the portions 71 and 72 do not have the symmetrical structure.

In the magnetic shield 60, the slit 62c is provided at the center in the circumferential direction between the first magnetic flux collecting portions 41b and 41c adjacent to each other in the circumferential direction. The same applies to the second magnetic flux collecting portions 42b and 42c adjacent to each other in the circumferential direction.

In the case of the structure of the present embodiment, the slit 62c of the magnetic shield 60 extends along the direction in which the magnetic flux passes through the magnetic sensor 51 or 52 arranged between the magnetic flux collecting portions 41b and 42b or the magnetic flux collecting portions 41c and 42c overlapping each other in the axial direction in the magnetic flux collecting rings 41 and 42. That is, the second shield portion 62 can continuously be connected without a disconnected portion in the direction in which the magnetic flux passes through the magnetic sensors 51 and 52. In this case, the second shield portion 62 can form a bypass along a component of the magnetic flux passing through the magnetic sensors 51 and 52 as a magnetic circuit of the external magnetic field. Therefore, the external magnetic field hardly passes through the magnetic sensors 51 and 52 by passing through the bypass, thereby suppressing the influence of the external magnetic field on the sensor device 1.

The clearance W1 of the slit 62c in the circumferential direction is set smaller than the clearance W2 between the first magnetic flux collecting portions 41b and 41c adjacent to each other in the circumferential direction. Even when the slit 62c has the clearance W1, the external magnetic field hardly passes through the clearance W2 between the portions 71 and 72. This is effective in suppressing the influence of the external magnetic field on the sensor device 1.

The shield bore radius L1 is set smaller than the ring outside radius L2b. In this case, the first shield portion 61 can not only cover the outer circumference of the magnetic flux collecting rings 41 and 42 by the body covering portion 61a, but also partially cover both ends of the magnetic flux collecting rings 41 and 42 in the axial direction by the edge portions 61b. Therefore, the magnetic shield 60 can induce, through the edge portions 61b of the first shield portion 61, an external magnetic field that is about to enter in the axial direction to suppress the influence on the magnetic sensors 51 and 52. This is effective in suppressing the influence of the external magnetic field on the sensor device 1.

Each first edge segment 71b has the slits 61c. The magnetic shield 60 of the present embodiment adopts, for example, a method of forming each first edge segment 71b of the first portion 71 by bending the end of the first body segment 71a in the axial direction inward in the radial direction with respect to the body segment 71a. Even when such a forming method is adopted, the work of forming each first edge segment 71b is facilitated. The same applies to the second portion 72.

In the case of adopting, for example, the method of forming each first edge segment 71b by bending the end of the first body segment 71a in the axial direction inward in the radial direction with respect to the body segment 71a, a stress may be generated at the root that is the starting point of bending at the time of forming the edge portion. This is because the residual stress generated due to the generation of the stress changes the magnetic characteristics of the magnetic shield 60.

In the present embodiment, each end of the first body segment 71a in the axial direction and the outer end of each first edge segment 71b in the radial direction in the first shield portion 61 are connected via the round connection portion 71d. In the connection portion 71d, the curvature radius R1 is set slightly larger in consideration of various tolerances such as manufacturing tolerances based on the value twice as large as the thickness T of the first body segment 71a in the radial direction and of the first edge segment 71b in the axial direction. In this case, it is possible to suppress the generation of the stress on the root of the bending in the magnetic shield 60 even in the case of adopting, for example, the method of forming each first edge segment 71b by bending the end of the first body segment 71a in the axial direction inward in the radial direction with respect to the body segment 71a. Therefore, it is possible to suppress the generation of the residual stress due to the generation of the stress to suppress the change in the magnetic characteristics of the magnetic shield. The same applies to each second edge segment 72b of the second portion 72.

During the secondary molding step, for example, a jig having substantially the same radius as the ring bore radius L2a may be inserted into the first shaft hole 81. For example, the jig holds the first molded body 80 at a predetermined position. Depending on the relationship between the shield bore radius L1 and the ring bore radius L2a, the magnetic shield 60 may interfere with the jig. In the present embodiment, the interference of the magnetic shield 60 and the jig can be avoided by setting the shield bore radius L1 to be larger than the ring bore radius L2a even though the jig is used.

In the sensor device 1 of the present embodiment using the magnetic shield 60, it is possible to reduce the cumbersomeness of the work of attaching the magnetic shield 60 to surround the magnetic flux collecting rings 41 and 42 in the radial direction and the axial direction.

Second Embodiment

A magnetic shield, a sensor device, and a method for attaching the magnetic shield according to a second embodiment will be described next with reference to the drawings. For convenience of description, the same components are represented by the same reference symbols as those in the first embodiment to omit their description.

In the first embodiment, the magnetic shield 60 is housed inside the housing 100. As illustrated in FIG. 7, the sensor device 1 of the present embodiment differs in that the magnetic shield 60 is fixed by fitting while being exposed to the outside of a housing 110 of the present embodiment.

Specifically, the housing 110 includes a fitting portion 120 for fitting the magnetic shield 60 from the outside. The fitting portion 120 only needs to surround the bodies 41a and 42a of the magnetic flux collecting rings 41 and 42 in the radial direction and the axial direction in a state in which the magnetic shield 60 is fitted. For example, the fitting portion 120 may have a groove shape that extends continuously and entirely in the circumferential direction, or a groove shape that extends continuously within a range except portions in the circumferential direction, such as portions corresponding to the slits 61d and 62c.

As illustrated in FIG. 8, in the magnetic shield 60 of the present embodiment, the shield bore radius L1 is set equal to or smaller than the ring bore radius L2a and smaller than the yoke outside radius L3. The shield bore radius L1 is set larger than a magnet outside radius L4 that is an outside radius of the permanent magnet 20.

Shield Bore Radius L1

When the shield bore radius L1 is set smaller than the yoke outside radius L3, the torque fluctuation in the steering torque that is a result of detection by the sensor device 1 may be influenced. This is because the shield bore radius L1 approaches the magnet outside radius L4 when the shield bore radius L1 is made smaller than the yoke outside radius L3. As the shield bore radius L1 approaches the magnet outside radius L4, the magnetic circuit formed by the magnetic shield 60 corresponds to the magnetic circuit of the magnetic field generated by the permanent magnet 20. This case exhibits a relationship in which a part of the magnetic flux to be detected by the magnetic sensors 51 and 52 of the sensor device 1 passes through the magnetic shield 60 to increase the torque fluctuation. This relationship can be described by defining the magnitude of the shield bore radius L1 by using the magnitude of the magnet outside radius L4.

For example, FIG. 9 illustrates a result experimentally obtained as a characteristic of the torque fluctuation when the magnitude of the shield bore radius L1 is changed. Specifically, the horizontal axis represents the shield bore radius L1, and the vertical axis represents the magnitude of torque fluctuation.

FIG. 9 demonstrates a result showing a characteristic that the torque fluctuation is suppressed as the shield bore radius L1 decreases from a maximum value Lmax toward a first threshold Lth1 equal to the yoke outside radius L3. This is because the external magnetic field transmitted to the magnetic flux collecting rings 41 and 42 can be blocked through the magnetic shield 60 in a wider range as the shield bore radius L1 decreases. The maximum value Lmax is equal to a value of the radius of a circle to be formed by the inner circumferential surface of the body covering portion 61a.

The result shows a characteristic that the torque fluctuation is further suppressed when the shield bore radius L1 further decreases, and then the torque fluctuation increases after the shield bore radius L1 falls below a second threshold Lth2 close to the magnet outside radius L4. This is because the magnetic flux passing through the magnetic shield 60 increases as the magnetic flux generated by the permanent magnet 20 when the shield bore radius L1 approaches the magnet outside radius L4. The boundary between the characteristic that the torque fluctuation is suppressed and the characteristic that the torque fluctuation increases is a characteristic point where the torque fluctuation is minimized. The result shows that the second threshold Lth2 serving as this characteristic point is equal to a value slightly closer to the magnet outside radius L4 based on an intermediate value between the yoke outside radius L3 and the magnet outside radius L4. In the present embodiment, the shield bore radius L1 is therefore set to the second threshold Lth2.

Method for Attaching Magnetic Shield 60

A method for assembling the sensor device 1 of the present embodiment will be described below together with a method for attaching the magnetic shield 60.

The method for assembling the sensor device 1 of the present embodiment is roughly divided into four steps in sequence, that is, a primary molding step, a secondary molding step, an assembling step, and a shield attaching step.

As illustrated in a portion (a) in FIG. 10, in the primary molding step, the first molded body 80 is formed by resin-molding the magnetic flux collecting rings 41 and 42 by the same method as that in the primary molding step described in the first embodiment.

As illustrated in a portion (b) in FIG. 10, in the secondary molding step, a second molded body 130 is formed by resin-molding the first molded body 80. After the resin molding in the secondary molding step, various components such as the sensor board on which the magnetic sensors 51 and 52 are mounted are fixed to the second molded body 130 by the same method as that in the secondary molding step described in the first embodiment. In this case, the sensor board is positionally adjusted so that the first magnetic sensor 51 is arranged between the magnetic flux collecting portions 41b and 42b and the second magnetic sensor 52 is arranged between the magnetic flux collecting portions 41c and 42c.

The second molded body 130 is molded to have the fitting portion 120 together with a second shaft hole 131 obtained by extending the first shaft hole 81 of the first molded body 80 in the axial direction. In the second molded body 130, the entire first molded body 80 may be covered, or a part of the first molded body 80 may be exposed through the fitting portion 120. In the second molded body 130, the portion molded through the secondary molding step functions as the housing 110.

As indicated by an arrow A in the portion (b) in FIG. 10, in the assembling step, the second molded body 130, that is, the housing 110 molded through the secondary molding step is attached together with various components such as the sensor board to cover the rotary shaft 10 to which the permanent magnet 20 and the magnetic yokes 31 and 32 are fixed from the side of the input shaft 11 to which the permanent magnet 20 is fixed. At the time of attachment to the rotary shaft 10 in the assembling step, the second molded body 130 is attached by inserting the rotary shaft 10 into the second shaft hole 131, that is, the first shaft hole 81.

In the state in which the second molded body 130 covers the rotary shaft 10, the permanent magnet 20, the magnetic yokes 31 and 32, and the magnetic flux collecting rings 41 and 42 are positionally adjusted to achieve predetermined arrangements while overlapping each other in the radial direction.

As indicated by arrows B in the portion (b) in FIG. 10, in the shield attaching step, the divided portion 70, that is, the first portion 71 and the second portion 72 are attached to the second molded body 130, that is, the housing 110 in the state in which the second molded body 130 covers the rotary shaft 10 through the assembling step. At the time of attachment in the shield attaching step, the portions 71 and 72 prepared in advance are fitted into the fitting portion 120 of the housing 110 from the outside of the housing 110 by the same method as that in the shield attaching step described in the first embodiment. The portions 71 and 72 are closely integrated to define the slits 61d and 62c as the boundary portions while sandwiching the first molded body 80 from the outside of the housing 110.

The appearance of the first shield portion 61 and the second shield portion 62 through the shield attaching step is similar to that described in the first embodiment. In the second molded body 130 to which the magnetic shield 60 is attached, the inner tips of each edge portion 61b and each second sensor covering portion 62b in the radial direction partially protrude into the first shaft hole 81 by an amount in which the shield bore radius L1 is smaller than the ring bore radius L2a. In the second molded body 130, the inner tips of each edge portion 61b and each second sensor covering portion 62b in the radial direction partially overlap the magnetic yokes 31 and 32 in the axial direction because the shield bore radius L1 is smaller than the yoke outside radius L3. In this way, the attachment of the magnetic shield 60 to the sensor device 1 and the assembling of the sensor device 1 are completed.

According to the present embodiment, the following effects are attained in addition to the actions and effects according to the first embodiment. The shield bore radius L1 is set smaller than the ring bore radius L2a. In this case, the first shield portion 61 can not only cover the outer circumference of the magnetic flux collecting rings 41 and 42 by the body covering portion 61a, but also entirely cover both ends of the magnetic flux collecting rings 41 and 42 in the axial direction by the edge portions 61b. Therefore, the magnetic shield 60 can induce, through the edge portions 61b of the first shield portion 61, an external magnetic field that is about to enter in the axial direction to suppress the influence on the magnetic sensors 51 and 52. This is effective in suppressing the influence of the external magnetic field on the sensor device 1.

Other Embodiments

The embodiments described above may be modified as follows. The following other embodiments may be combined with each other without causing technical inconsistency.

In the embodiments described above, the outer shell of the first shield portion 61 that is viewed in the axial direction may have, for example, a polygonal shape as illustrated in FIG. 11. In this case, in the body covering portion 61a, that is, the body segments 71a and 72a, portions where the slits 61c and 61d are provided are vertices, and each outer surface in the radial direction between adjacent vertices is a plane. According to this embodiment, the work of forming the edge segments 71b and 72b is facilitated.

In the embodiments described above, the curvature radius R1 may be equal to the value twice as large as the thickness T of each of the body segments 71a and 72a in the radial direction and each of the edge segments 71b and 72b in the axial direction. The curvature radius R1 may be set smaller than the value twice as large as the thickness T. In this case, the connection portions 71d and 72d and portions having similar structures as those of the connection portions 71d and 72d include a case of a right-angled shape instead of the round shape. For example, when the connection portion 71d has a right-angled shape, the first portion 71 may be formed by providing the first body segment 71a and each first edge segment 71b as separate members and joining those segments by welding, adhesion, or the like. The same applies to the second portion 72.

In the embodiments described above, the slits 61c may be omitted at each edge portion 61b. The slit 61d need not appear in the first shield portion 61. In this case, the divided portion 70 is obtained by integrating the two portions that are the first portion 71 and the second portion 72 in contact with each other. That is, in the body covering portion 61a, the portions 71 and 72 may abut against each other without a clearance in the state in which the portions 71 and 72 are integrated. Similarly, the slit 62c need not appear in the second shield portion 62. That is, in each second sensor covering portion 62b, the portions 71 and 72 may abut against each other without a clearance in the state in which the portions 71 and 72 are integrated.

In the embodiments described above, for example, the shield bore radius L1 may be set smaller than the ring bore radius L2a and larger than the yoke outside radius L3 as illustrated in FIG. 12. In this case, the first shield portion 61 can not only cover the outer circumference of the magnetic flux collecting rings 41 and 42 by the body covering portion 61a, but also entirely cover both ends of the magnetic flux collecting rings 41 and 42 in the axial direction by the edge portions 61b. In addition, the shield bore radius L1 may be set equal to the ring bore radius L2a, the ring outside radius L2b, or the yoke outside radius L3, or may be set equal to or larger than the ring bore radius L2a. The shield bore radius L1 may be equal to the maximum value Lmax. That is, each edge portion 61b may be omitted in the first shield portion 61, or each second sensor covering portion 62b may be omitted in the second shield portion 62.

In the embodiments described above, the clearance W1 of the slit 62c may be set, for example, equal to or larger than the clearance W2 when an external magnetic field hardly passes. In addition, the clearance W1 may be set regardless of the clearance W2 when there is no need to consider the entry of the external magnetic field in the axial direction.

In the embodiments described above, the slit 62c may be offset to one side in the circumferential direction from the center in the circumferential direction between the first magnetic flux collecting portions 41b and 41c or the second magnetic flux collecting portions 42b and 42c adjacent to each other. In this case, the portions 71 and 72 have an asymmetric structure. When the portions 71 and 72 have the asymmetric structure, the slit 62c need not be provided in each second sensor covering portion 62b, and the function of the slit 62c may be implemented by using, as a substitute, any one of the slits 61c in each edge portion 61b. This is effective in increasing the degree of freedom in terms of design of the magnetic shield 60, typified by division of the divided portion 70 into three or more parts.

In the embodiments described above, the portions 71 and 72 may be divided in the axial direction. In this case, a slit corresponding to the slit 62c may be provided at the center of each first sensor covering portion 62a in the axial direction. In addition, the body covering portion 61a may be divided into two parts in the axial direction at the center in the axial direction. In this embodiment, each second sensor covering portion 62b extends continuously in the circumferential direction. This is effective when the magnetic flux collecting portions 41b and 42b and the magnetic flux collecting portions 41c and 42c overlap each other in the circumferential direction.

In the embodiments described above, each of the magnetic flux collecting rings 41 and 42 may have only one magnetic flux collecting portion or three or more magnetic flux collecting portions. In this case, the number of magnetic sensors 50 may be set to only one or three or more to be equal to the number of magnetic flux collecting portions.

In the embodiments described above, a metal material other than the SPCC or the SECC or a thermoplastic resin material containing metal powder may be adopted for each of the portions 71 and 72. When the resin material containing metal powder is adopted for each of the portions 71 and 72, each of the portions 71 and 72 may be formed by injection molding using dies.

In the embodiments described above, the number of slits 61c of each edge portion 61b may be increased, reduced, or changed as appropriate. When the portions 71 and 72 have the asymmetric structure, the numbers of slits 61c may be varied between the portions 71 and 72.

In the second embodiment, the primary molding step and the secondary molding step may be implemented as one step. In this case, a molded body corresponding to the second molded body 130 may be formed by collectively resin-molding the magnetic flux collecting rings 41 and 42 in the same manner as in the primary molding step.

In the embodiments described above, the magnetic yokes 31 and 32 may be fixed to the input shaft 11, and the permanent magnet 20 may be fixed to the output shaft 12. In this case, the output shaft 12 corresponds to the first shaft, and the input shaft 11 corresponds to the second shaft.

In the embodiments described above, the first magnetic flux collecting ring 41 may be obtained by integrally fixing two individual components that are a first component being the first body 41a and a second component being a combination of the magnetic flux collecting portions 41b and 41c. In this case, the second component may integrally be fixed to the first component via, for example, a jig. The same applies to the second magnetic flux collecting ring 42. Both the magnetic flux collecting rings 41 and 42 or either one of the magnetic flux collecting rings 41 and 42 may be obtained by using the two individual components.

In the embodiments described above, a magneto-resistive sensor may be adopted as each of the magnetic sensors 51 and 52. In the embodiments described above, the sensor device 1 is embodied as the torque sensor for detecting a torque, but may be embodied as, for example, a torque angle sensor having an additional function to detect a rotation angle of the rotary shaft 10.

In the embodiments described above, the sensor device 1 detects the torque applied to the steering shaft of the electric power steering system, but may detect a torque applied to a rotary shaft of a steer-by-wire steering system in which power transmission between a steering portion and a steered portion is separated.

What is claimed is:

1. A magnetic shield to be attached to a sensor device to surround a magnetic flux collecting ring from an outer side in a radial direction of a rotary shaft including a first shaft and a second shaft coupled to each other via a torsion bar, the sensor device including a permanent magnet fixed to the first shaft and magnetized in a circumferential direction of the first shaft, a magnetic yoke fixed to the second shaft and arranged in a magnetic field of the permanent magnet to surround the permanent magnet from the outer side in the radial direction, the magnetic flux collecting ring including a body arranged to surround the magnetic yoke from the outer side in the radial direction and a magnetic flux collecting portion extending outward in the radial direction from the body, and a magnetic sensor arranged in association with the magnetic flux collecting portion and configured to detect a magnetic flux of a magnetic circuit including the permanent magnet, the magnetic yoke, and the magnetic flux collecting ring, the magnetic shield comprising a divided portion divided into a first portion and a second portion before attachment to the sensor device, wherein
the first portion and the second portion are provided separately from each other in the circumferential direction,
the first portion and the second portion have a symmetrical structure,
the divided portion is integrated by bringing the first portion and the second portion close to or in contact with each other during the attachment to the sensor device,
the divided portion in an integrated state includes a first shield portion that surrounds the body of the magnetic flux collecting ring from the outer side in the radial direction, and a second shield portion that surrounds the magnetic flux collecting portion of the magnetic flux collecting ring together with the magnetic sensor to extend outward in the radial direction from the first shield portion, and
the first portion has a first part of two parts into which the first shield portion is divided at a first boundary portion in the circumferential direction and a first part of two parts into which the second shield portion is divided at the first boundary portion in the circumferential direction, and the second portion has a second part of two parts into which the second shield portion is divided at a second boundary portion in the circumferential direction and a second part of two parts into which the second shield portion is divided at the second boundary portion in the circumferential direction.

2. The magnetic shield according to claim 1, wherein
the magnetic yoke includes two magnetic yokes juxtaposed in an axial direction of the rotary shaft,
the magnetic flux collecting ring includes two magnetic flux collecting rings juxtaposed in the axial direction,
the magnetic flux collecting portion includes two magnetic flux collecting portions spaced away from each other in the circumferential direction on the body,
the magnetic sensor includes two magnetic sensors each arranged between the magnetic flux collecting portions overlapping each other in the axial direction among the magnetic flux collecting portions of the two magnetic flux collecting rings, and
the second boundary portion does not overlap the magnetic flux collecting portions of the two magnetic flux collecting rings in the axial direction, and overlaps, in the axial direction, a portion between the two magnetic flux collecting portions adjacent to each other in the circumferential direction.

3. The magnetic shield according to claim 2, wherein
the first portion and the second portion have a clearance in the circumferential direction at the second boundary portion, and
the clearance is set smaller than a clearance between the two magnetic flux collecting portions adjacent to each other in the circumferential direction in each of the two magnetic flux collecting rings.

4. The magnetic shield according to claim 1, wherein
the first shield portion includes a body covering portion that covers the body from the outer side in the radial direction, and
the first shield portion includes edge portions provided at both ends of the body covering portion in an axial direction of the rotary shaft to extend inward in the radial direction from the both ends, and a bore radius of an imaginary circle connecting inner tips of each of the edge portions in the radial direction is set smaller than an outside radius or a bore radius of the body.

5. The magnetic shield according to claim 4, wherein each of the edge portions has a plurality of slits extending outward in the radial direction from an inner end in the radial direction.

6. The magnetic shield according to claim 4, wherein
the first shield portion includes a connection portion connecting the body covering portion and each of the edge portions,
the connection portion has a round shape, and a curvature radius of a part of the connection portion on a side where the magnetic flux collecting ring is provided is set twice or more as large as a thickness of the first shield portion.

7. A sensor device comprising the magnetic shield according to claim 1.

8. A method for attaching a magnetic shield to be attached to a sensor device to surround a magnetic flux collecting ring from an outer side in a radial direction of a rotary shaft including a first shaft and a second shaft coupled to each other via a torsion bar, the sensor device including a permanent magnet fixed to the first shaft and magnetized in a circumferential direction of the rotary shaft, a magnetic yoke fixed to the second shaft and arranged in a magnetic field of the permanent magnet to surround the permanent magnet from the outer side in the radial direction, the magnetic flux collecting ring including a body arranged to surround the magnetic yoke from the outer side in the radial direction and a magnetic flux collecting portion extending outward in the radial direction from the body, and a magnetic sensor arranged in association with the magnetic flux collecting portion and configured to detect a magnetic flux of a magnetic circuit including the permanent magnet, the magnetic yoke, and the magnetic flux collecting ring, the sensor device being structured such that a molded body obtained by resin-molding the magnetic flux collecting ring is attached to cover the rotary shaft together with the magnetic sensor, the method comprising resin-molding the magnetic shield in a predetermined state together with the magnetic flux collecting ring during resin molding of the molded body, the predetermined state being a state in which a divided portion is integrated by bringing a first portion and a second portion close to or in contact with each other to include a first shield portion and a second shield portion, the divided portion being divided into the first portion and the second portion before attachment to the sensor device, the first portion and the second portion being provided separately from each other in the circumferential direction, the first portion and the second portion having a symmetrical structure, the first shield portion surrounding the body of the magnetic flux collecting ring from the outer side in the radial direction, the second shield portion surrounding the magnetic flux collecting portion of the magnetic flux collecting ring together with the magnetic sensor, and the first portion has a first part of two parts into which the first shield portion is divided at a first boundary portion in the circumferential direction and a first part of two parts into which the second shield portion is divided at the first boundary portion in the circumferential direction, and the second portion has a second part of two parts into which the second shield portion is divided at a second boundary portion in the circumferential direction and a second part of two parts into which the second shield portion is divided at the second boundary portion in the circumferential direction.

9. A method for attaching a magnetic shield to be attached to a sensor device to surround a magnetic flux collecting ring from an outer side in a radial direction of a rotary shaft including a first shaft and a second shaft coupled to each other via a torsion bar, the sensor device including a permanent magnet fixed to the first shaft and magnetized in a circumferential direction of the rotary shaft, a magnetic yoke fixed to the second shaft and arranged in a magnetic field of the permanent magnet to surround the permanent magnet from the outer side in the radial direction, the magnetic flux collecting ring including a body arranged to surround the magnetic yoke from the outer side in the radial direction and a magnetic flux collecting portion extending outward in the radial direction from the body, and a magnetic sensor arranged in association with the magnetic flux collecting portion and configured to detect a magnetic flux of a magnetic circuit including the permanent magnet, the magnetic yoke, and the magnetic flux collecting ring, the sensor device being structured such that a molded body obtained by resin-molding the magnetic flux collecting ring is attached to cover the rotary shaft together with the magnetic sensor, the method comprising attaching the magnetic shield by causing the molded body to cover the rotary shaft together with the magnetic sensor and then integrating a divided portion by bringing a first portion and a second portion close to or in contact with each other to include a first shield portion and a second shield portion, the divided portion being divided into the first portion and the second portion before attachment to the sensor device, the first portion and the second portion being provided separately from each other in the circumferential direction, the first portion and the second portion having a symmetrical structure, the first shield portion surrounding the body of the magnetic flux collecting ring from the outer side in the radial direction, the second shield portion surrounding the magnetic flux collecting portion of the magnetic flux collecting ring together with the magnetic sensor, and the first portion has a first part of two parts into which the first shield portion is divided at a first boundary portion in the circumferential direction and a first part of two parts into which the second shield portion is divided at the first boundary portion in the circumferential direction, and the second portion has a second part of two parts into which the second shield portion is divided at a second boundary portion in the circumferential direction and a second part of two parts into which the second shield portion is divided at the second boundary portion in the circumferential direction.

* * * * *